US006189510B1

(12) United States Patent
Jaeger et al.

(10) Patent No.: US 6,189,510 B1
(45) Date of Patent: Feb. 20, 2001

(54) FUEL DISTRIBUTION SYSTEM WITH FLEXIBLE METALLIC CONDUITS FOR AN INTERNAL COMBUSTION ENGINE

(75) Inventors: Matthew W. Jaeger; Gregory B. Deavers, both of Stillwater, OK (US)

(73) Assignee: Brunswick Corporation, Lake Forest, IL (US)

( * ) Notice: Under 35 U.S.C. 154(b), the term of this patent shall be extended for 0 days.

(21) Appl. No.: 09/350,463

(22) Filed: Jul. 9, 1999

(51) Int. Cl.[7] .............................. F02M 55/02; F16L 11/00

(52) U.S. Cl. ...................... 123/468; 123/198 D; 138/121

(58) Field of Search .................................... 123/468, 469, 123/198 D; 138/121, 118, 137, 28

(56) References Cited

U.S. PATENT DOCUMENTS

| | | | | |
|---|---|---|---|---|
| 2,848,254 | | 8/1958 | Millar | 285/149 |
| 3,549,176 | | 12/1970 | Contreras | 285/55 |
| 3,743,328 | | 7/1973 | Longfellow | 285/226 |
| 4,175,882 | * | 11/1979 | Gilead | 405/43 |
| 4,819,970 | * | 4/1989 | Umehara | 285/227 |
| 5,142,782 | | 9/1992 | Martucci | 29/890 |
| 5,170,011 | | 12/1992 | Martucci | 174/47 |
| 5,192,476 | | 3/1993 | Green | 264/127 |
| 5,476,080 | * | 12/1995 | Brunnhofer | 123/468 |
| 5,538,294 | | 7/1996 | Thomas | 285/55 |
| 5,720,504 | * | 2/1998 | Stedman et al. | 285/226 |
| 5,960,977 | * | 10/1999 | Ostrander et al. | 220/86.1 |
| 5,988,226 | * | 11/1999 | Matthews | 138/109 |

OTHER PUBLICATIONS

Brochure, AIRMO Inc., Minneapolis, MN.

* cited by examiner

*Primary Examiner*—Noah P. Kamen
*Assistant Examiner*—Mahmoud M Gimie
(74) *Attorney, Agent, or Firm*—William D. Lanyi

(57) ABSTRACT

A fuel line for an internal combustion engine is provided by forming a metallic tube into regions with folds and other regions without folds. As a result, a flexible metallic conduit is formed which can be easily bent during assembly to an internal combustion engine. The fuel line does not require elastomeric seals or other non-metallic elements. As a result, the fuel line is highly flame resistant and abrasion resistant and can be manufactured less expensively than more complicated composite fuel lines known to those skilled in the art.

15 Claims, 10 Drawing Sheets

FUEL DISTRIBUTION SYSTEM WITH FLEXIBLE METALLIC CONDUITS FOR AN INTERNAL COMBUSTION ENGINE

BACKGROUND OF THE INVENTION

1. Field of the Invention

The present invention is generally related to a fuel distribution system and, more particularly, to a fuel distribution system for a marine internal combustion engine in which flexible metallic conduits are used to distribute fuel between a source and a destination.

2. Description of the Prior Art

In certain types of internal combustion engines, particularly in marine applications, it is necessary to provide fuel lines which are not susceptible to leaking when subjected to certain adverse conditions, such as extreme temperatures. For example, paragraph 6.4 of standard SAE J1527 of the Society of Automotive Engineers provides a test which include the steps of filling the hose with fuel, insuring that no air is left in the hose, insuring that the air velocity outside the system does not exceed 0.5 meters per second, pouring heptane into a fuel pan a prescribed distance between the test subject hose, allowing the heptane to burn for 150 seconds, and opening a valve so that fuel can flow through the hose under test. The hose is then subjected to a hydrostatic pressure corresponding to 35.4 inches of fuel and inspected for signs of leakage. This type of testing, and other test procedures, require that a fuel line exhibit a high degree of temperature and pressure resistance under very adverse conditions.

Three known procedures have been used to satisfy the stringent conditions described above. First, rigid metal tubing can be formed to traverse a path between a liquid fuel source, such as a fuel pump, and a liquid fuel destination, such as a fuel rail of a fuel injected system or a carburetor. A second method is to provide a fire sleeve which completely surrounds the fuel line and extends the entire length of the fuel line between the liquid fuel source and the liquid fuel destination. A third procedure is to use coated and braided hose assemblies that have been proven to be sufficiently temperature and abrasion resistant to satisfy the rigorous tests required for fuel lines.

Many types of fire resistant and abrasion resistant conduits are known to those skilled in the art. U.S. Pat. No. 5,142,782, which issued to Martucci on Sep. 1, 1992, discloses a coated braided hose method and assembly. A method is provided for making a lightweight hose assembly including a step of extruding the inner liner. A nonmetallic material is then braided about the exterior of the liner. The inner liner and braided layer are then passed through a reservoir containing a solution of the fluorocarbon polymer. The solvent is then removed, leaving fluorocarbon polymer coating dispersed throughout the braided layer.

U.S. Pat. No. 5,170,011, which issued to Martucci on Dec. 8, 1992, described a hose assembly. The lightweight hose assembly of the type adapted for conveying fuels and other corrosive fluids, is disclosed. The assembly includes a tubular inner liner comprising a polymeric fluorocarbon material resistant to chemical and heat degradation, and is characterized by including an outer liner comprising an expanded polyamide material disposed about the inner lining. The assembly further includes a conductive strip formed along the inner liner for dissipating electrical charges accumulating along the inner liner.

U.S. Pat. No. 5,192,476, which issued to Green on Mar. 9, 1993, describes a method for forming a conduit by pre-coating the conduit prior to braiding. The method described is for forming a hose assembly of the type adapted for carrying fuels and other corrosive fluids. An inner liner of a fluorocarbon material is extruded. The inner liner is then passed through a reservoir containing a dispersion including a fluorocarbon polymer material and a fluid. Glass fibers are then braided about the exterior of the inner liner to form a braided layer having the dispersion thereabout such that the dispersion penetrates the interstitial spaces of the braided layer. Subsequently, the assembly is heated to remove the fluid. The assembly is then sintered to cure the fluorocarbon polymer material into a coating dispersed throughout the braided layer and about the inner liner.

U.S. Pat. No. 3,743,328, which issued to Longfellow on Jul. 3, 1973, describes a gas appliance connector. A flexible metal tubing forms a connector and has a wall thickness of from 0.020 inches to 0.064 inches and is corrugated by two helical corrugations, the coils of which are in alternate arrangement.

U.S. Pat. No. 5,538,294, which issued to Thomas on Jul. 23, 1996, describes a corrugated flexible metal piping assembly. The assembly includes a body with corrugations having spiral or annular configurations. End connections are mounted on the body ends, which can be flanged or male-threaded. A layer of insulating or sealing material can be applied over the body. The end connections can be male-threaded or female-threaded. A bellows configuration is provided with annular corrugations which taper in proximity to the body ends.

U.S. Pat. No. 2,848,254, which issued to Millar on Aug. 19, 1958, discloses end fittings for flexible metal hoses. An end fitting is provided for a corrugated metallic hose having at least one surrounding tubular reinforcement, with the end fitting comprising an annular gripper sleeve having an internally grooved part which receives a plurality of the external corrugations of the end portions of the hose lying therewithin, with the corrugations at the front extremity of said hose projecting forwardly beyond the grooved part of the sleeve.

U.S. Pat. No. 3,549,176, which issued to Contreras on Dec. 22, 1970, describes a flexible flow liner for a bellows joint. The flexible corrugated bellows connects two flanged tubes of a fluid line. A liner is disposed within the bellows and is fabricated of woven wire braid. One end of the liner is fixed to one of the tubes and the other end has a guide which is slidable within the outer tube.

Flexible metallic conduits are available in commercial quantities from Airmo Inc. The flexible metallic conduits are manufactured with cylindrical surfaces that are shaped to comprise a plurality of folds to form a bellows shape which affords a certain degree of flexibility to the resulting tubular structure.

All of the patents described above are hereby explicitly incorporated by reference in the description of the preferred embodiment.

SUMMARY OF THE INVENTION

The present invention provides a fuel distribution system for an internal combustion engine that comprises a liquid fuel source and a liquid fuel destination. The liquid fuel source can be a fuel pump, a fuel rail, a fuel regulator, a fuel/water separator, or any other component of an internal combustion engine from which liquid fuel is conducted under pressure. The liquid fuel destination can be a carburetor, a fuel rail, a fuel/water separator, a fuel pump, or any other component of an internal combustion engine toward which liquid fuel is conducted under pressure or by vacuum. The present invention further comprises a flexible metallic conduit connected in fluid communication between the liquid fuel source and the liquid fuel destination. The flexible metal conduit has a surface that is shaped to comprise a plurality of folds in at least one region of the flexible metallic conduit which allow the flexible metallic conduit to be manually bent during installation on an internal combustion engine and connection between the liquid fuel source and liquid fuel destination conforming to a preferred path without damaging the flexible metallic conduit.

The plurality of folds can be formed by a single spiral groove extending between opposite ends of the region of folds or, alternatively, the plurality of folds can be formed by a plurality of individual circumfential grooves disposed between opposite ends of the region of folds.

In a preferred embodiment of the present invention, the region of folds is disposed between portions of the flexible metal conduit which have outer surfaces which are generally smooth without folds formed therein. In other words, a localized flexible region of the conduit is located between straight sections of metal tubing that are not, in themselves, easily flexible or conducive to manual bending of the conduit during installation and connection between the liquid fuel source and the liquid fuel destination.

Alternatively, other embodiments of the present invention can provide a flexible metal conduit with a surface that is shaped to comprise the plurality of folds in at least a first and a second region of the flexible metal conduit. These regions allow the flexible metal conduit to be manually bent during installation and connection between the liquid fuel source and the liquid fuel destination to conform to a preferred path without damaging the flexible metal conduit. The flexible metal conduit further comprises a portion which has outer surfaces that are generally smooth and without folds formed therein. This smooth portion of the flexible conduit is disposed between the first and second regions that are provided with the plurality of folds.

An internal combustion engine can be part of a marine propulsion system, but it should be understood that the present invention can be used on gasoline, diesel, or natural gas engines which are not used as part of a marine propulsion system.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
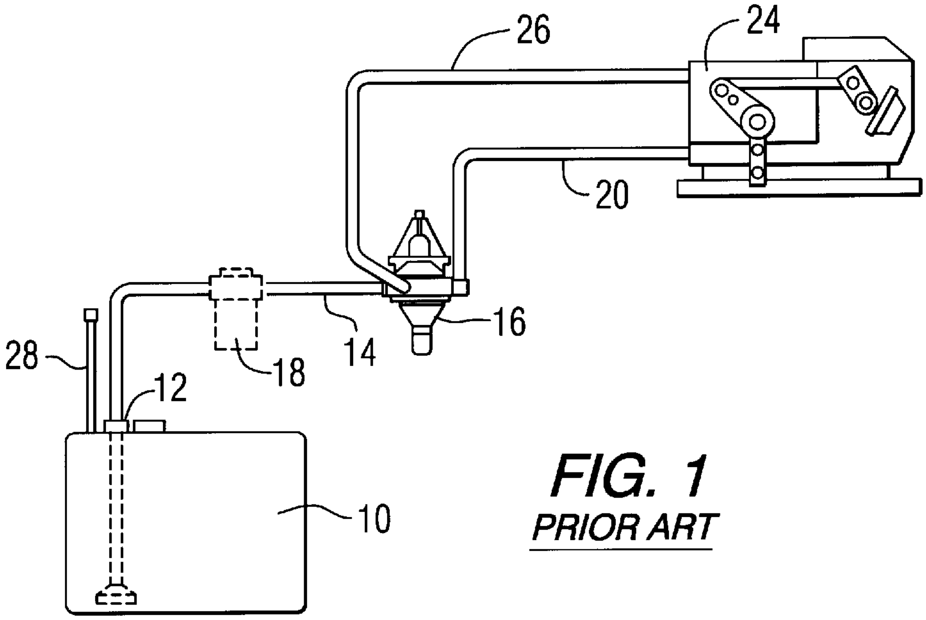
FIG. 1 PRIOR ART
FIG. 1 is a simplified schematic showing a fuel distribution system.

Throughout the description of the preferred embodiment, like components will be identified by like reference numerals.

FIG. 1 is a schematic representation of a typical fuel system for a marine propulsion system. A fuel tank 10 is provided with an anti-siphon valve 12 and a fuel line 14 that connects the tank to a fuel pump 16. A water separating fuel filter 18 can optionally be included in the fuel line 14, but is not a requirement in all fuel systems. A fuel line 20 connects a carburetor 24 to the fuel pump 16. A sight tube 26 is also connected between the fuel pump and the carburetor 24. A vent hose 28 is connected to the fuel tank 10. The fuel lines in FIG. 1 are extended along generally simple paths in the illustration because FIG. 1 is highly schematic. However, it should be realized that the fuel lines used in an actual internal combustion engine system are often required to traverse tortuous paths between a liquid fuel source and a liquid fuel destination. These paths typically require that the fuel line be bent in several locations in order to circumvent intervening structures between the liquid fuel source and the liquid fuel destination.

Figure 2:
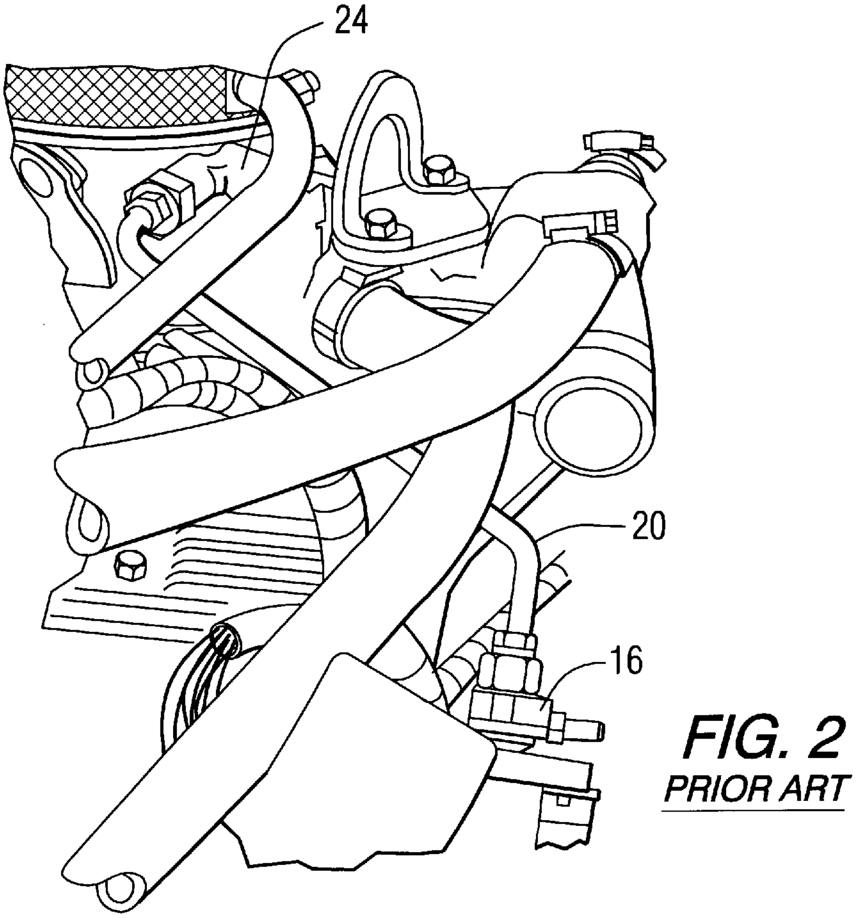
FIG. 2 PRIOR ART
FIG. 2 shows one application of a rigid fuel line.
Figure 4:
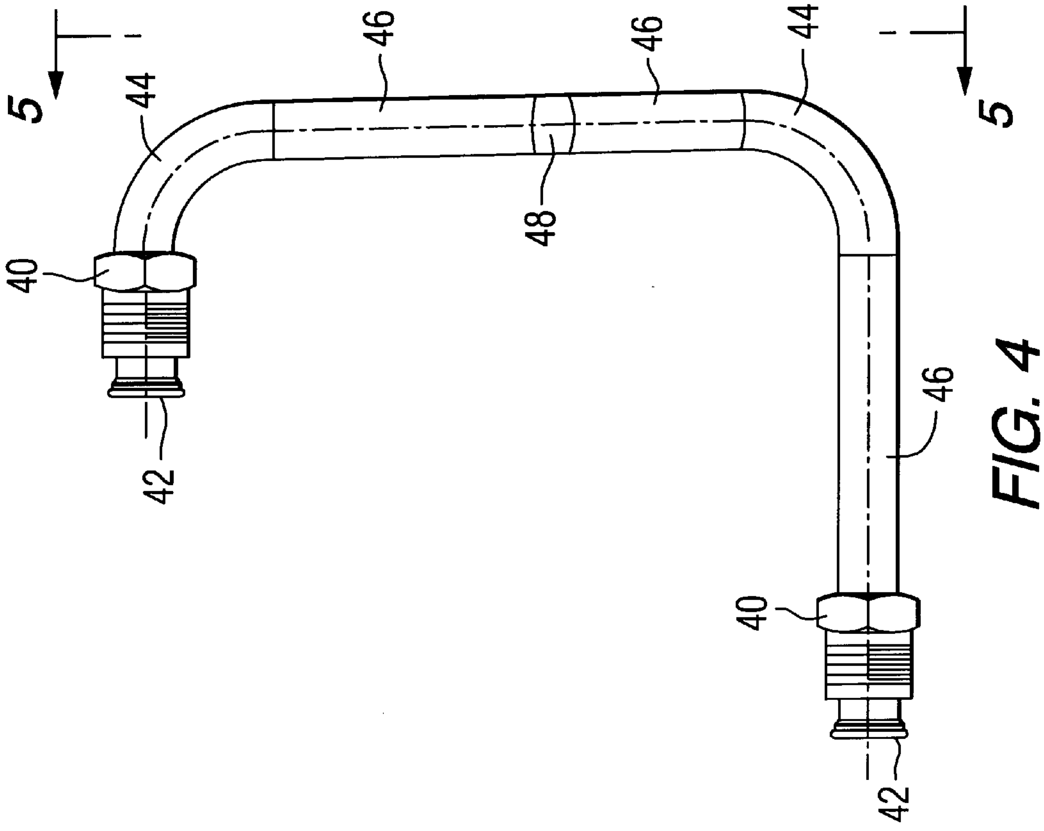
FIG. 4 PRIOR ART

FIG. 2 is a simplified representation of a fuel line that passes from a fuel pump 16 to a carburetor 24. The fuel line 20 in FIG. 2 is bent at two locations to traverse the path between the liquid fuel source, or fuel pump 16, and the liquid fuel destination, or carburetor 24. In addition, it should be noted that the two bends of the fuel line 20 are in different planes so that the fuel line 20 can avoid intervening structures between the liquid fuel source and the liquid fuel destination while assuring that the ends of the fuel line 20 are properly aligned to mate with the fuel pump 16 and carburetor 24. In FIG. 4, fuel line 20 is a generally rigid stainless steel tube that is preformed to include the bends which result in the proper alignment of the tube ends with the fuel source and fuel destination. The bends are also pre-formed in such a way that the fuel line 20 extends through open spaces between other structures of the engine. It can be recognized that the fuel line 20 shown in FIG. 2 must be accurately bent to form the required angles and geometry since an operator does not have an ability to easily correct any errors in geometry of the fuel line 20 during the installation procedure. It should also be recognized that the generally rigid fuel line 20 illustrated in FIG. 2 must be positioned between the intervening structures prior to assembly of the ends to the fuel source and fuel destination. This procedure can be difficult and time consuming.

Figure 3:
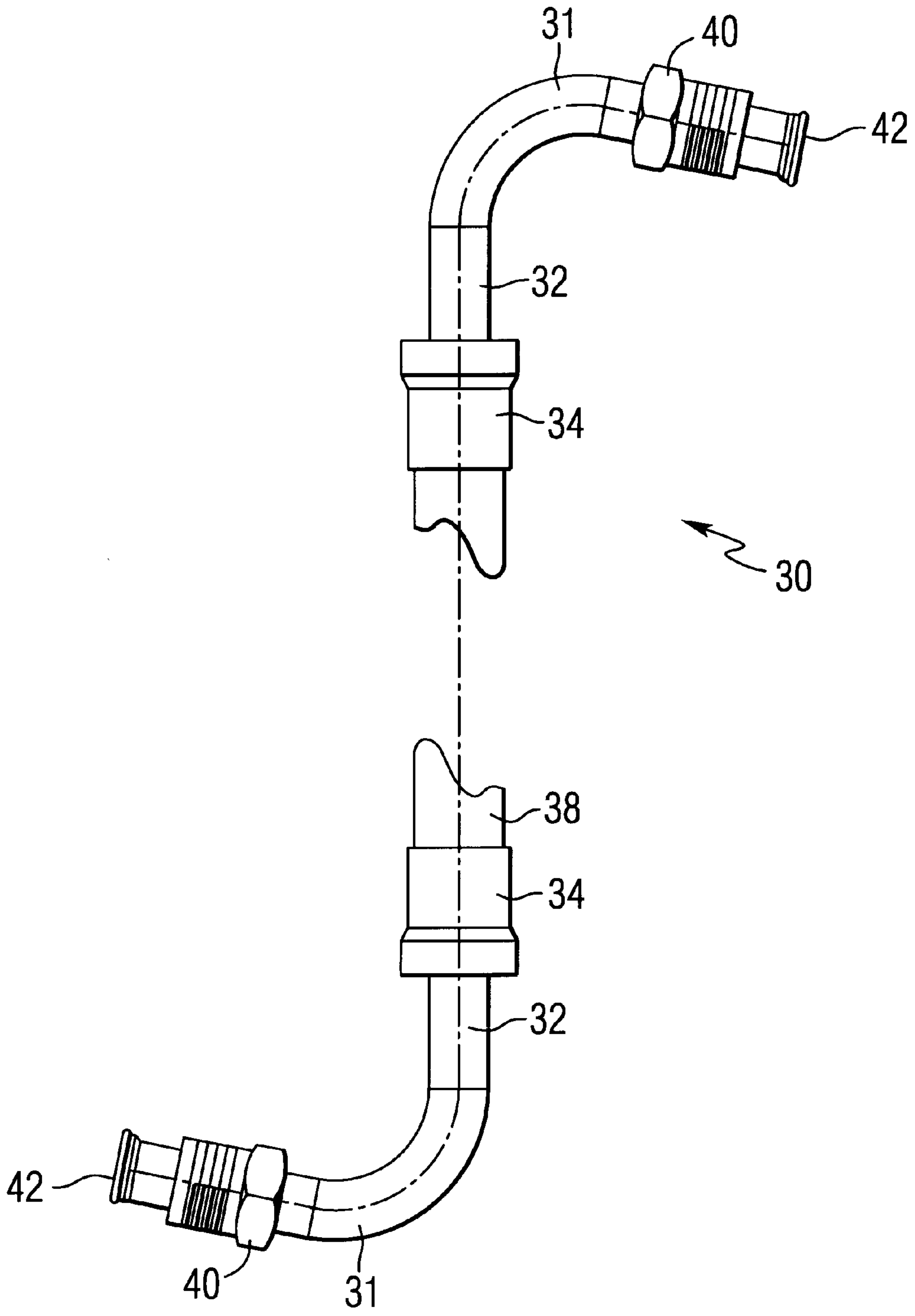
FIG. 3 PRIOR ART
FIG. 3 shows a composite fuel line.

In comparison to FIG. 2, which showed a fuel line 20 that is formed of a single rigid metallic tube, the fuel line 30 shown in FIG. 3 is a composite structure. The portions identified by reference numerals 31 and 32 in FIG. 3 are generally rigid tubular structures that are pre-formed in a generally J-shape. The straight portions 32 are rigidly attached to ferrules by a swaging procedure. Between the ferrules 34, a braided hose 38 provides some degree of flexibility. The braided hose 38 can comprise the types of structures described in U.S. Pat. Nos. 5,142,782 or 5,170,011 discussed above. Brass couplings 40 allow the flared ends 42 to be attached to the liquid fuel source and liquid fuel destination. The structure shown in FIG. 3 allows a certain degree of flexibility which provides a significant benefit to an operator who is assembling the fuel line 30 to an internal combustion engine. The flexibility provided by the hose 38 allows the operator to make minor adjustments in positioning the ends 42 of the fuel line to assure proper installation. The fuel line 30 shown in FIG. 3 is a significant improvement to the fuel line 20 shown in FIG. 2, but the composite structure shown in FIG. 3 is expensive to manufacture.

FIG. 4 shows a type of solid metallic fuel line generally similar to the fuel line 20 in FIG. 2, but shaped to traverse a different type of path between the liquid fuel source and the liquid fuel destination of an engine. The fuel line shown in FIG. 4 comprises several straight sections 46, two 90 degree bends 44, and an additional bend 48 that allows the fuel line to suit a particular purpose.

Figure 5:
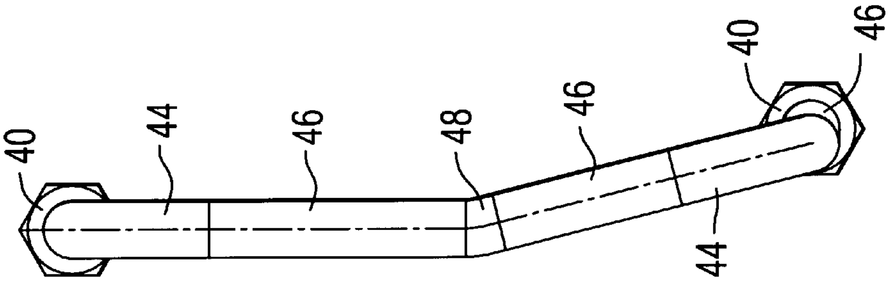
FIG. 5 PRIOR ART
FIGS. 4 and 5 show a generally rigid metallic fuel line.

FIG. 5 is a side view of FIG. 4 showing the purpose of the bend 48 that allows the fuel line to extend out of the plain represented by FIG. 4 and dispose the flared ends 42 at their required positions to assure proper attachment to the liquid fuel source and liquid fuel destination. It should be appreciated that the fuel line illustrated in FIGS. 4 and 5 is generally rigid and the bends, 44 and 48, are provided prior to the assembly procedure in conjunction with an engine. This requires accurate shaping of the metallic tube and also complicates the assembly process since an operator is required to thread the fuel line between other engine components so that the flared ends 42 are located in close proximity to the liquid fuel source and the liquid fuel destination, permitting the brass fittings 40 to be tightened. Even when the fuel lines are bent to suit a preselected path between a fuel source and a fuel destination, some manual readjustment is usually necessary to alter the configuration of the fuel line. This realignment is necessitated by the build up of tolerances as the engine and its attached components are assembled together.

Figure 6:
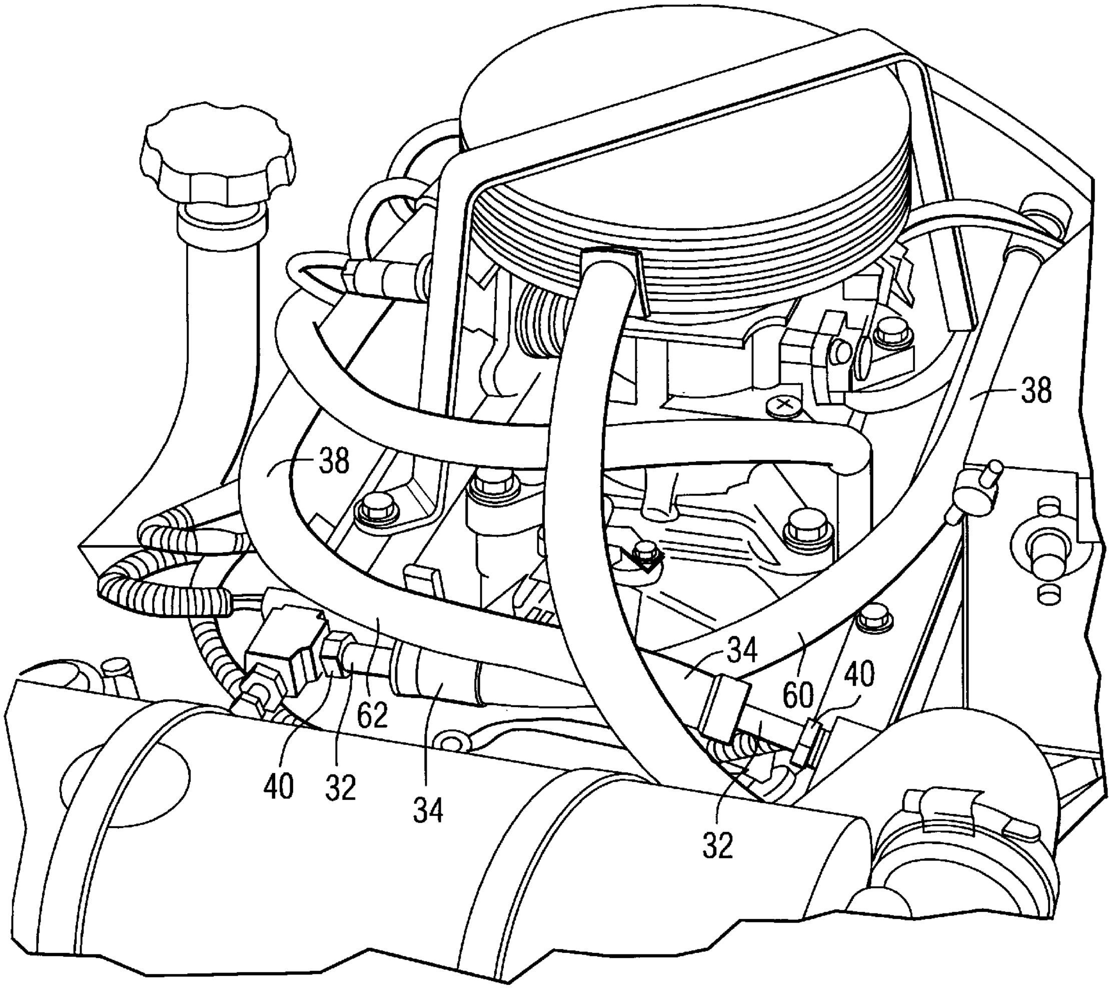
FIG. 6 PRIOR ART
FIG. 6 shows two composite fuel lines assembled to an internal combustion engine.

FIG. 6 shows two fuel lines, 60 and 62, that are of the general structure described above in conjunction with FIG. 3. The ferrules 34 are swaged to the tubing members 32 and the brass fittings 40 are used to tighten the composite structure to the fuel sources and fuel destinations. The non-metallic hoses 38 extend between the fuel sources and fuel destinations to allow a certain limited degree of freedom in bending the fuel line to suit the installation procedures. The illustration shown in FIG. 6 is intended to demonstrate the complexity of the shape of a fuel line in many typical applications and to show the complex path required to be traversed by fuel lines in many internal combustion engine systems.

Figure 7:
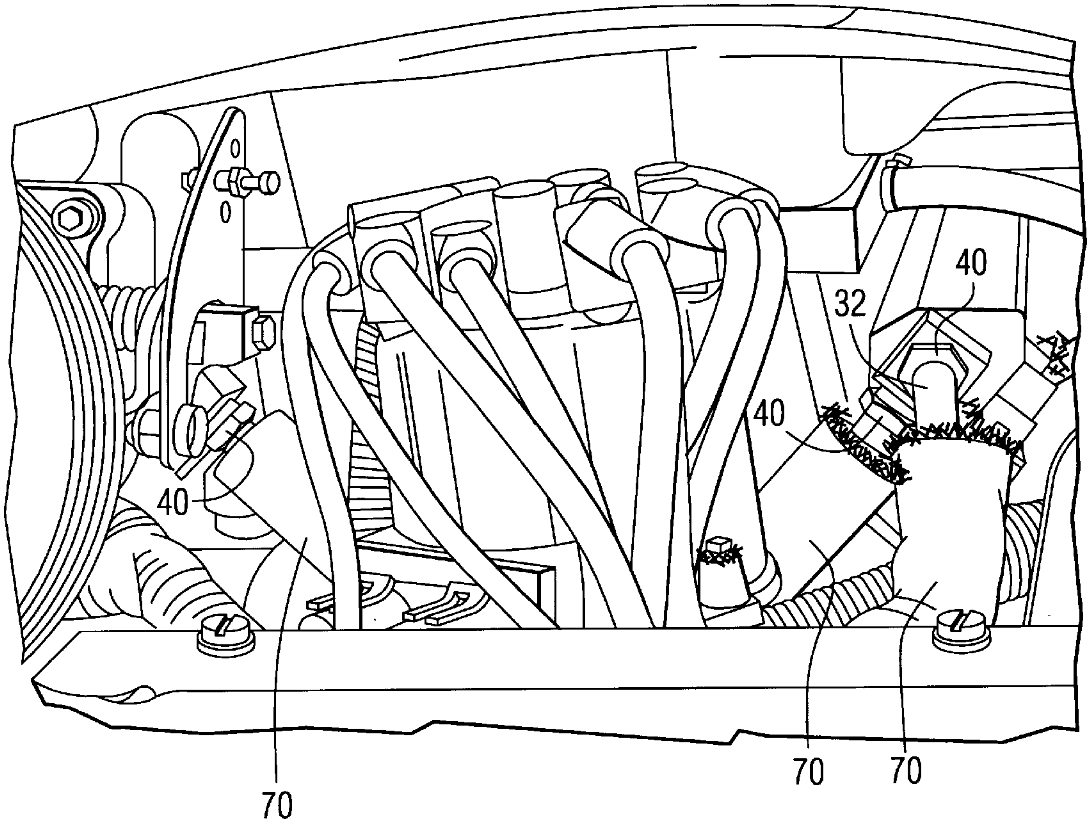
FIG. 7 PRIOR ART
FIG. 7 shows two fuel lines surrounded by a flame resistant shield.

FIG. 7 shows two fuel lines that are wrapped in a fire resistance cover 70, or fire sleeve. The brass fittings 40 are identified to illustrate the position of the ends of the fuel lines at the liquid fuel sources and liquid fuel destinations. The fire sleeves 70 are provided to further protect the fuel line from heat damage in the event that a fire starts in the engine area. Various industry standards, such as the SAE standard described above, are provided to assure that, in the event of a fire on or near the engine, fuel will not leak from the fuel line and exacerbate the situation by contributing more fuel to the fire. FIG. 7 also illustrates the complex paths along which fuel lines must traverse in many engine applications.

Figure 8:
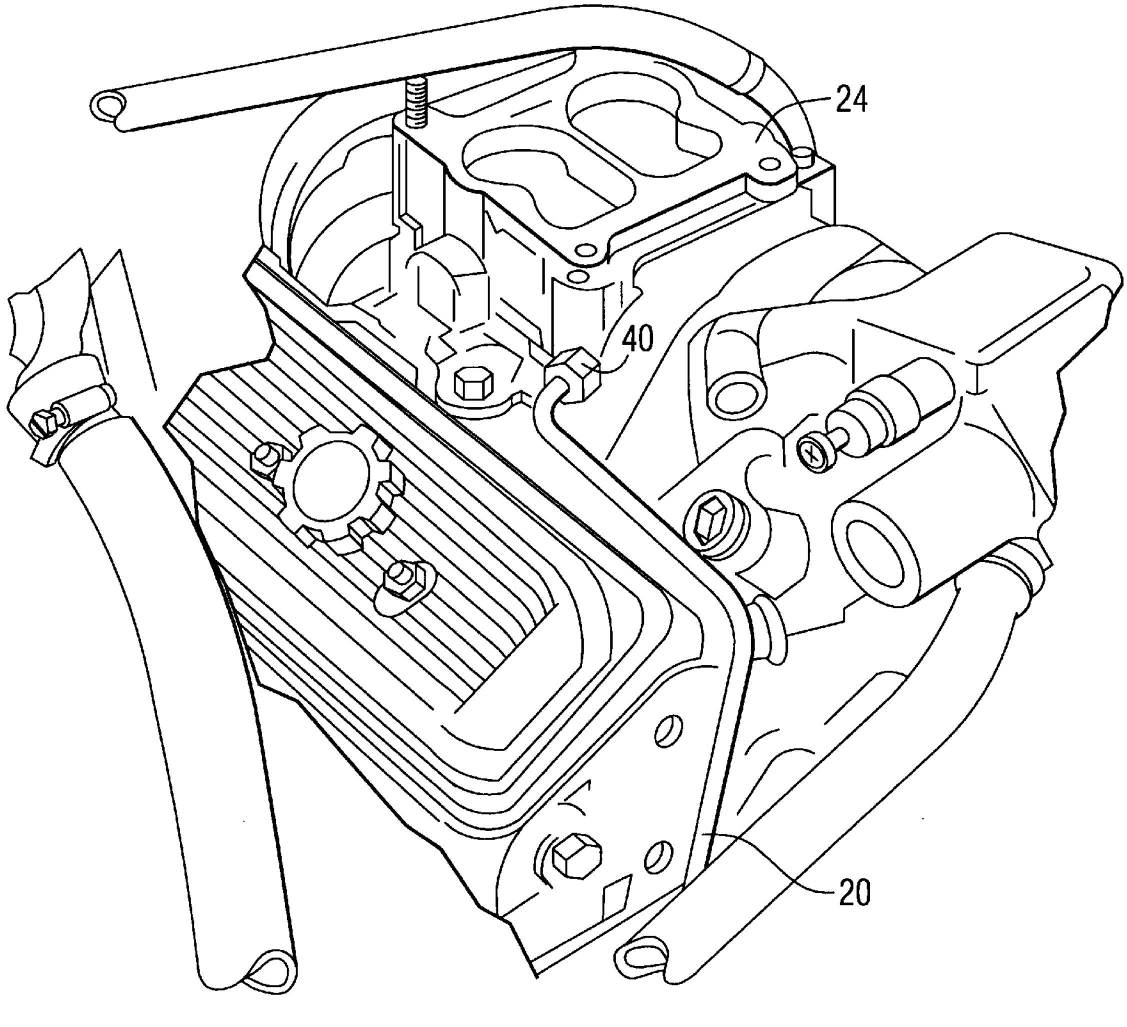
FIG. 8 PRIOR ART
FIG. 8 shows a generally rigid fuel line attached to an internal combustion engine.

FIG. 8 is another illustration showing an application in which a fuel line 20 passes between a liquid fuel source such as a fuel pump, and the carburetor 24. The fuel line is provided with several bends that allows it to pass in close proximity to the engine block and head, but not in direct contact with these or other components of the engine. The fuel line 20 shown in FIG. 8 is a solid metallic fuel line that is bent at several locations to allow it to extend along the desired path between the liquid fuel source and the liquid fuel destination.

Figure 9:
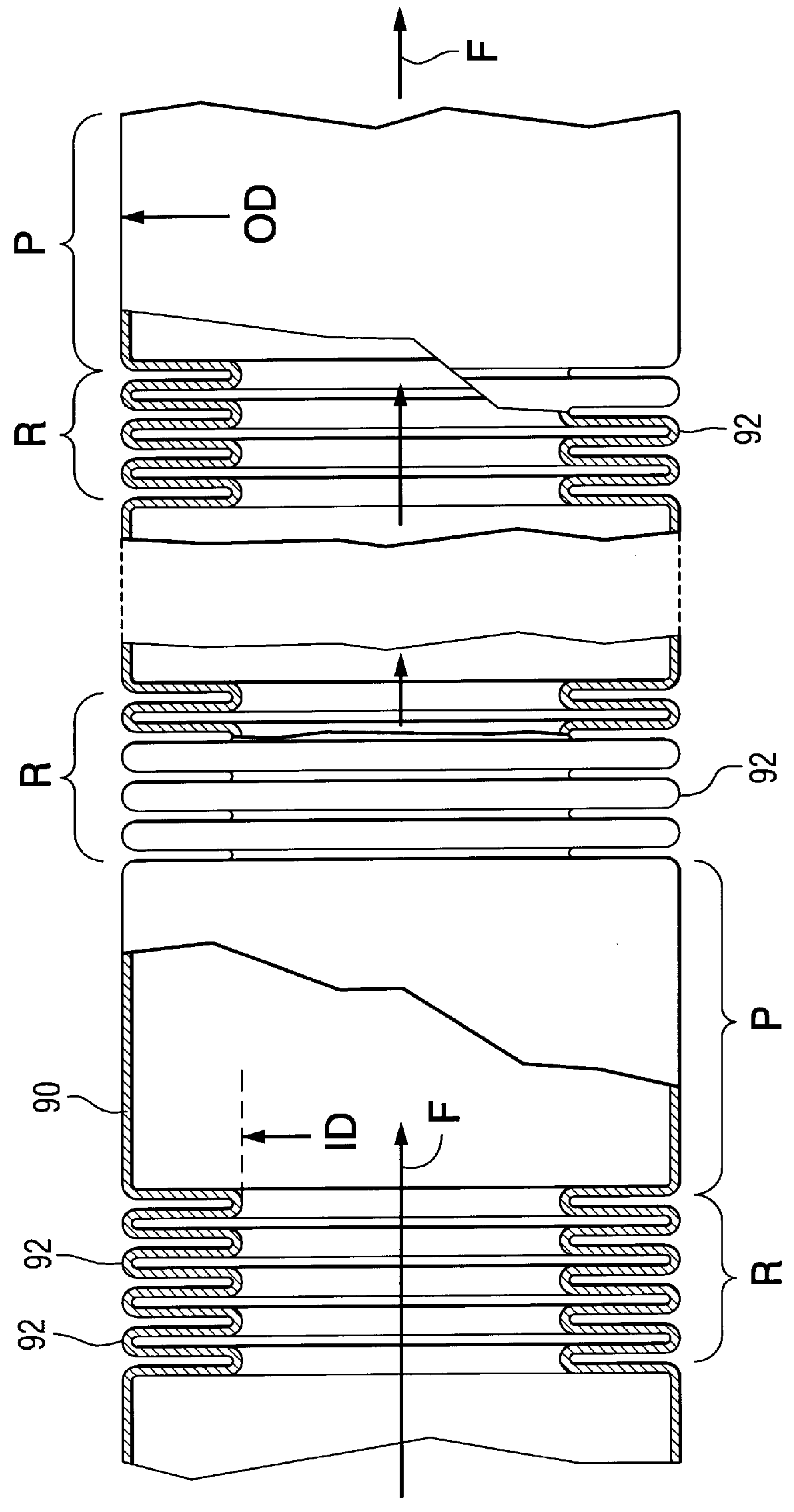
FIG. 9 is a partially sectioned view of a fuel line made in accordance with the present invention.

The present invention utilizes a technology that is generally known and used in certain applications to conduct fluids. The tubing shown in FIG. 9 has a relatively thin wall 90 which can be approximately 0.028 inches thick. Through the use of techniques applied by the Airmo Company and other tubing and equipment manufacturers, the wall 90 of the tube can be shaped to form a plurality of folds 92 as shown in both an external and internal section view in FIG. 9. In certain applications of this technology, a tube can be deformed to provide as many as nine folds 92 per linear inch of the tube. Also in certain applications of this technology, the folds 92 extend diametrically to define an OD of 0.625 inches and an ID of 0.319 inches. Although it should be realized that the specific dimensions and shapes of the folds 92 of the tube can vary significantly from one application to another, it has been determined that a fuel line for an internal combustion engine made in accordance with this technology can be advantageously shaped to have an outside diameter OD and an inside diameter ID of approximately the dimensions described herein. Similarly, nine folds 92 per linear inch has been found to allow sufficient bending flexibility to permit an operator to deform the fuel line sufficiently to facilitate the assembly and attachment of the ends of the fuel line to the fuel source and fuel destination that are typical in fuel lines of an internal combustion engine, particularly for a marine propulsion system. The folds allow the operator to bend the fuel line at the region or regions R where the folds 92 exist. In certain embodiments of the present invention, straight portions P are provided so that the fuel line has sufficient stiffness to maintain its position between the liquid fuel source and the liquid fuel destination. FIG. 9 shows both folded regions R and straight, rigid portions P of the fuel line. Arrows F indicate the path along which liquid fuel can flow through the fuel line.

Figure 10:
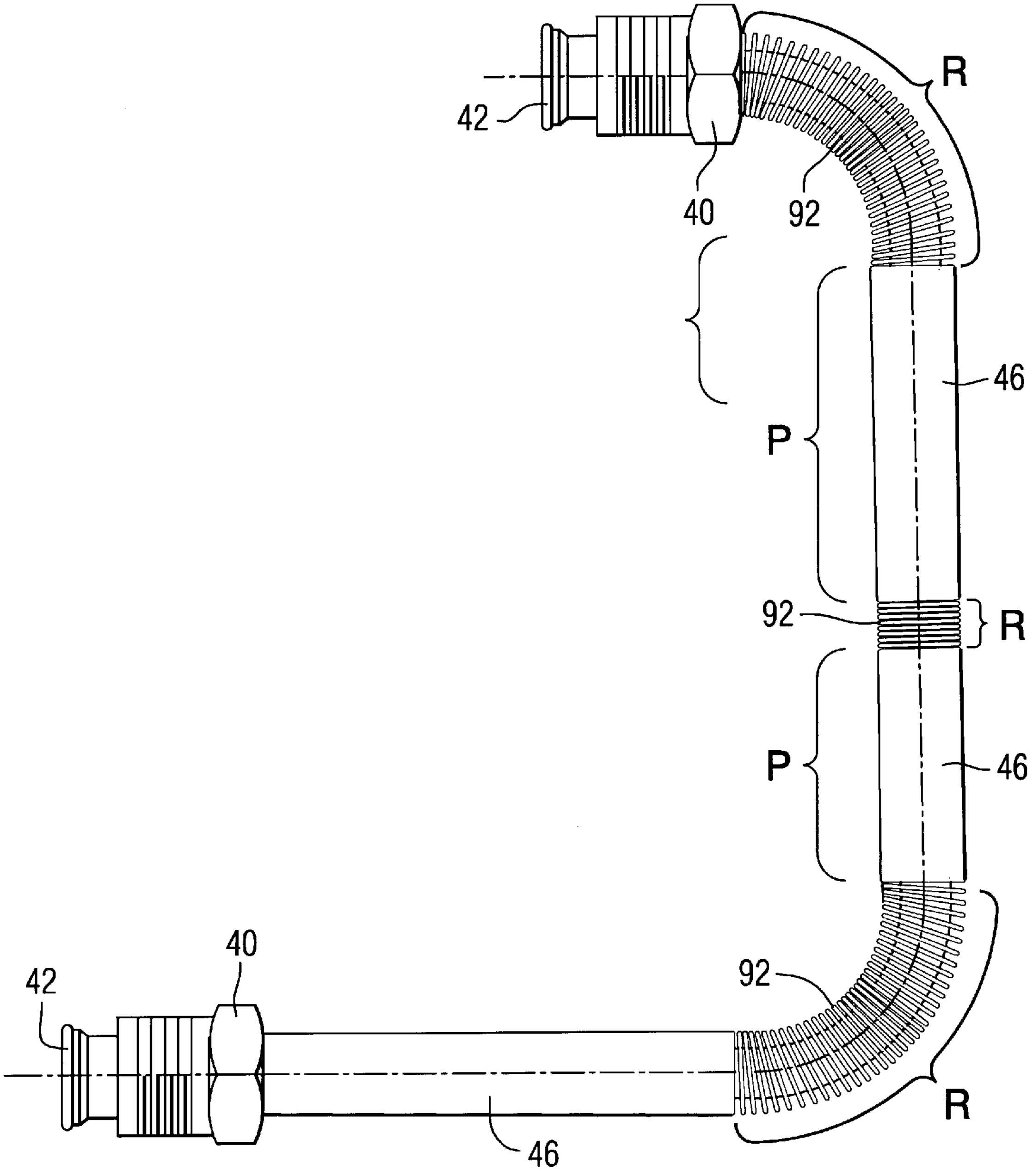
FIG. 10 is a fuel line made in accordance with the present invention.

FIG. 10 shows a fuel line in the same general shape as that described above in conjunction with FIG. 4. However, the 90 degree bends 44 and the slight bend 48 shown in FIG. 4 have been replaced by regions R that comprise a plurality of folds 92 formed in the surface of the metallic tube. The fuel line also comprises straight sections 46, as described in FIG. 4 above, which are portions P of the fuel line that do not comprise a plurality of folds. With a structure such as that shown in FIG. 10, the fuel line can be assembled to an engine by bending the fuel line at the regions R having folds. Assembly of the fuel line to an internal combustion engine is significantly simplified by a structure such as the fuel line shown in FIG. 10 because an operator can easily define a shape for the fuel line that allows it to traverse a desired path in close proximity to the engine while fitting properly to the liquid fuel source and liquid fuel destination to allow the brass fittings 40 to be properly tightened to prevent leaks. In contradistinction to the types of fuel lines described above in conjunction with FIG. 3, no non-metallic portions exist in the fuel line of FIG. 10. Therefore, the fuel line illustrated in FIG. 10 is highly heat resistant and abrasion resistant. However, in contradistinction to the fuel line described above in conjunction with FIGS. 4 and 5, ease of assembly of the fuel line to an internal combustion engine is significantly improved.

It should be understood that the present invention, when advantageously applied, places the regions R with folds 92 at strategic locations that facillitate the fitting of the fuel line to its associated fuel sources and fuel destinations. Merely making the entire fuel line a region R of folds 92 may be applicable in certain situations, but complicated paths can be significantly simplified if the regions R of folds 92 are advantageously located between straight portions P and the lengths of the straight portions P are selected to best traverse the path between the fuel source and the fuel destination.

Figure 11:
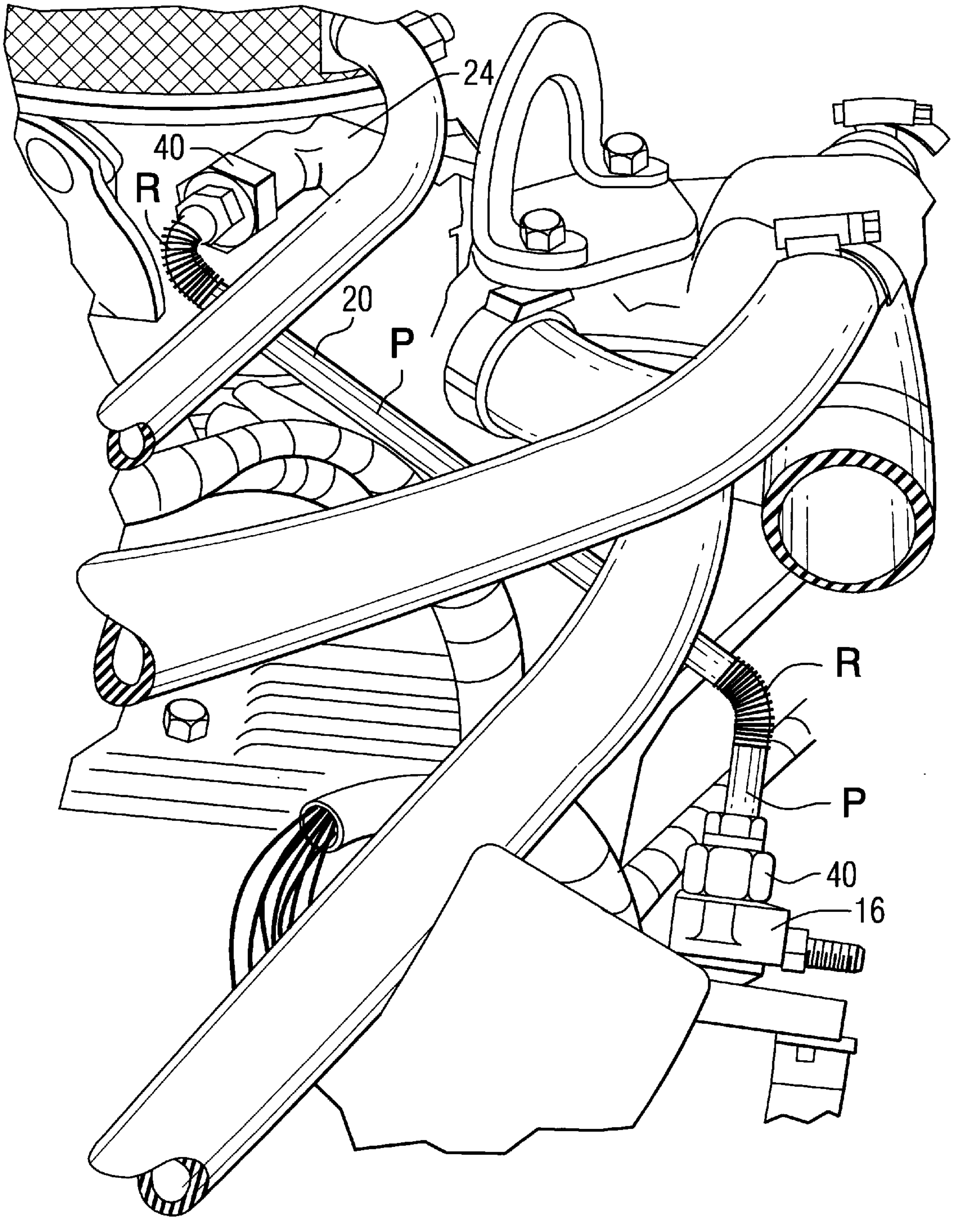
FIG. 11 shows a fuel line made in accordance with the present invention and assembled to an internal combustion engine.

FIG. 11 shows a fuel line 20 that is generally similar in function to the fuel line 20 of FIG. 2, but with regions R that comprise a plurality of folds similar to those described above in conjunction with FIG. 9. The two regions R with folds allow an operator to easily bend and distort the fuel line during assembly in order to properly align the ends of the fuel line with the fuel source, such as the fuel pump 16, and the fuel destination, such as the carburetor 24. The straight portions P of the fuel line 20 retain sufficient rigidity to prevent the fuel line 20 from moving relative to the engine by a significant amount during operation of the engine.

Figure 12:
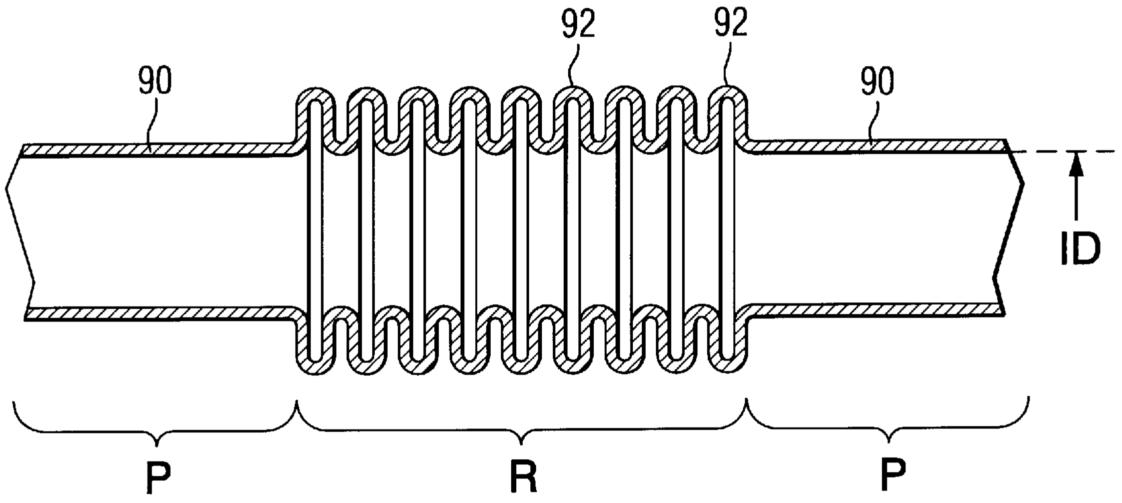
FIG. 12 is a section view of a tube with a bellows formed in its surface.

FIG. 12 shows a short segment of a tube with a region R being formed to define a plurality of folds 92. The region R of folds 92 is located between two straight portions P with no folds. The inside diameter ID defines a conduit through which a fluid can flow. The fluid can be a liquid, such as gasoline or diesel fuel, or a gas, such as natural gas. The configuration shown in FIG. 12, with a combination of a region R with folds 92 surrounded by straight portions P with no folds can be used to define a single bend location, as shown in FIG. 12, or a plurality of such combinations, as shown in FIG. 9. The number of regions R and straight portions P are not limiting to the present invention.

It should be understood that flexible metallic conduits are known to those skilled in the art. Some of the folds, or undulations, formed in the conduits are helical in nature while others are circumferential. The helical types of flexible metallic conduits incorporate one or two helical grooves that continue along and around the conduit for its entire length. Therefore, although a plurality of folds are formed as a result of this type of structure, in reality only a small number of helical grooves are used. In the types of flexible metallic conduits which comprise circumferential grooves, each fold in the surface of the tube is provided by an individual continuous circumferential groove that is independent from other grooves that form other folds. The present invention is not limited to either of these two basic types of flexible metallic conduits with folds formed in the surface of the conduit.

As described above, flexible metallic conduits are generally known to those skilled in the art. However, they have not been used in applications which conduct liquid fuel from a fuel source to a fuel destination in conjunction with an internal combustion engine. Prior to the provision of the present invention, the problems relating to fuel lines of internal combustion engines have been addressed in one of three basic ways. A composite structure such as the fuel line described in conjunction with FIG. 3, has been used. In addition, flame resistance covers 70, or fire sleeve, as described in conjunction with FIG. 7, have been used. In addition, generally rigid metallic tubes, such as the fuel line described in conjunction with FIG. 4, have been preshaped and used as fuel lines in internal combustion engines. However, flexible metallic conduits which contain no non-metallic elements, such as O-rings or other elastomeric seals, have not been used prior to the introduction of the present invention.

It should be understood that although the present invention has been described with particular specificity and illustrated to show several embodiments, alternative embodiments are also within its scope.

What is claimed is:

1. A fuel distribution system for an internal combustion engine of a marine propulsion system, comprising:

a liquid fuel source;

a liquid fuel destination; and a flexible metallic conduit connected in fluid communication between said liquid fuel source and said liquid fuel destination, said flexible metallic conduit having a surface shaped to comprise a plurality of folds in at least one region of said flexible metallic conduit which allow said flexible metallic conduit to be manually bent during installation and connection between said liquid fuel source and said liquid fuel destination to conform to a preferred path without damaging said flexible metallic conduit, said flexible metallic conduit having a surface shaped to comprise said plurality of folds in at least a first and a second region of said flexible metallic conduit which allow said flexible metallic conduit to be manually bent during installation and connection between said liquid fuel source and said liquid fuel destination to conform to a preferred path without damaging said flexible metallic conduit, said flexible metallic conduit further comprising a portion of said flexible metallic conduit which has outer surfaces which are generally smooth and without folds formed therein, said portion being disposed between said first and second regions.

2. The fuel distribution system of claim 1, wherein:

said plurality of folds are formed by a single spiral groove extending between opposite ends of said region.

3. The fuel distribution system of claim 1, wherein:

said plurality of folds are formed by a plurality of individual circumferential grooves disposed between opposite ends of said region.

4. The fuel distribution system of claim 1, wherein:

said fuel source is a fuel pump.

5. The fuel distribution system of claim 1, wherein:

said fuel source is a fuel pressure regulator.

6. The fuel distribution system of claim 1, wherein:

said fuel source is a fuel rail.

7. The fuel distribution system of claim 1, wherein:

said fuel source is a fuel tank.

8. The fuel distribution system of claim 1, wherein:

said fuel destination is a fuel rail.

9. The fuel distribution system of claim 1, wherein:

said fuel source is a fuel filter.

10. The fuel distribution system of claim 1, wherein:

said at least one region is disposed between portions of said flexible metallic conduit which have outer surfaces which are generally smooth and without folds formed therein.

11. A fuel distribution system for an internal combustion engine of a marine propulsion system, comprising:

a liquid fuel source;

a liquid fuel destination; and a flexible metallic conduit connected in fluid communication between said liquid fuel source and said liquid fuel destination, said flexible metallic conduit having a surface shaped to comprise a plurality of folds in at least one region of said flexible metallic conduit which allow said flexible metallic conduit to be manually bent during installation and connection between said liquid fuel source and said liquid fuel destination to conform to a preferred path without damaging said flexible metallic conduit, said plurality of folds being formed by a plurality of individual circumferential grooves disposed between opposite ends of said region, said flexible metallic conduit has a surface shaped to comprise said plurality of folds in at least a first and a second region of said flexible metallic conduit which allow said flexible metallic conduit to be manually bent during installation and connection between said liquid fuel source and said liquid fuel destination to conform to a preferred path without damaging said flexible metallic conduit, said flexible metallic conduit further comprising a portion of said flexible metallic conduit which has outer surfaces which are generally smooth and without folds formed therein, said portion being disposed between said first and second regions.

12. The fuel distribution system of claim 11, wherein:

said fuel source is a fuel pump.

13. The fuel distribution system of claim 11, wherein:

said fuel source is a fuel tank.

14. The fuel distribution system of claim 11, wherein:

said fuel source is a fuel filter.

15. The fuel distribution system of claim 11, wherein:

said at least one region is disposed between portions of said flexible metallic conduit which have outer surfaces which are generally smooth and without folds formed therein.

* * * * *